Oct. 10, 1933.  R. A. CHAUVOT  1,930,416
SLIDING AND PIVOTING WRISTLET WATCH
Filed Feb. 24, 1932   3 Sheets-Sheet 1
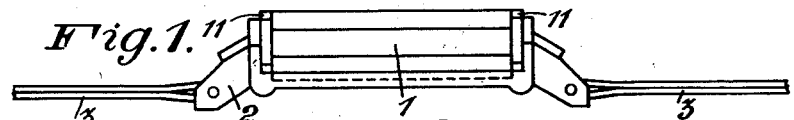
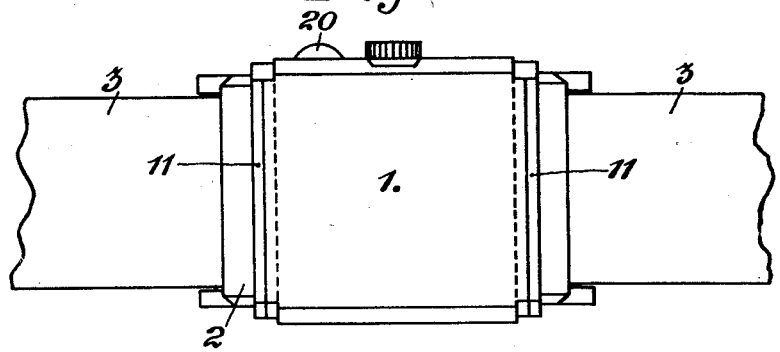
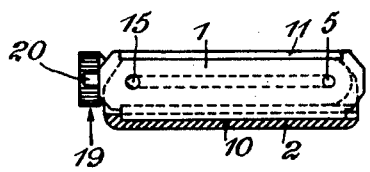 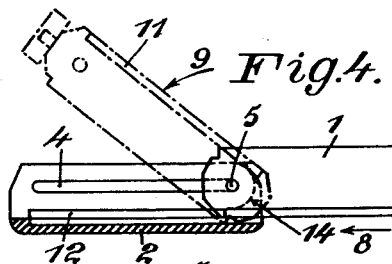
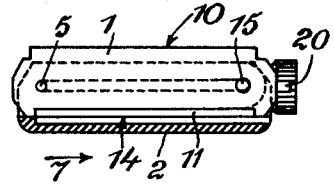
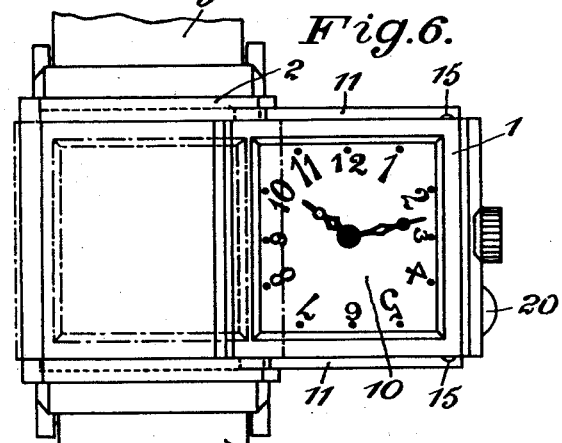
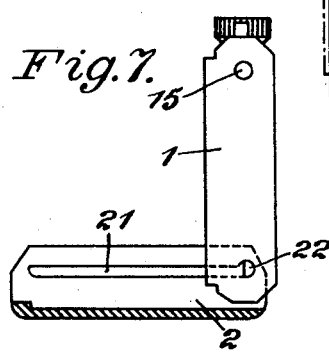
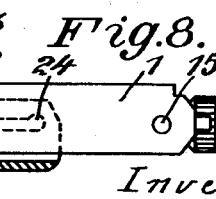
Inventor:
R. A. Chauvot,
by E. F. Wendworth
Atty Oct. 10, 1933. R. A. CHAUVOT 1,930,416
SLIDING AND PIVOTING WRISTLET WATCH
Filed Feb. 24, 1932 3 Sheets-Sheet 2
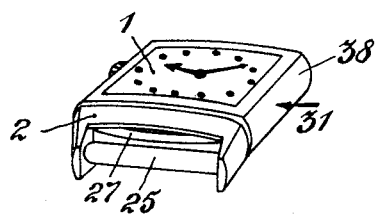
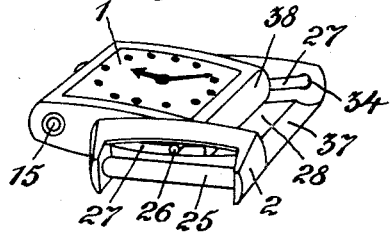
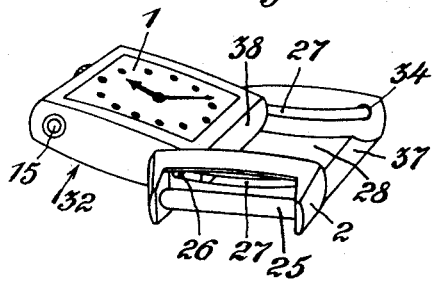
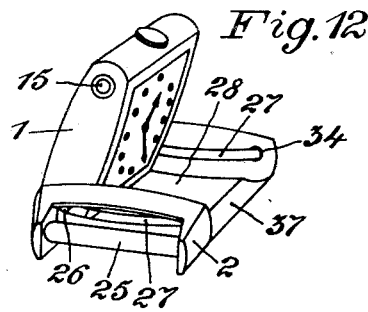
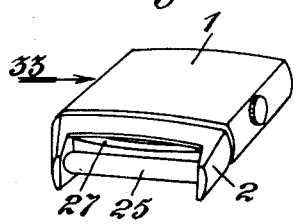
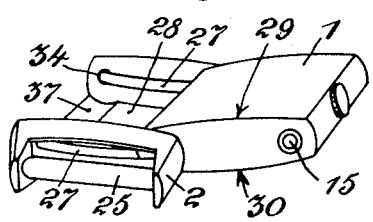
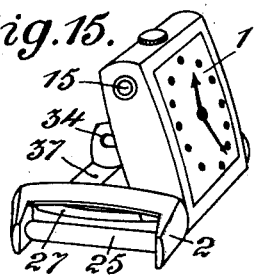
Inventor:
R. A. Chauvot Oct. 10, 1933.   R. A. CHAUVOT   1,930,416
SLIDING AND PIVOTING WRISTLET WATCH
Filed Feb. 24, 1932   3 Sheets-Sheet 3

Inventor:
R. A. Chauvot,
Atty

Patented Oct. 10, 1933

1,930,416

UNITED STATES PATENT OFFICE 1,930,416

SLIDING AND PIVOTING WRISTLET WATCH

René Alfred Chauvot, Paris, France

Application February 24, 1932, Serial No. 594,950, and in France March 4, 1931

10 Claims. (Cl. 58—88)

The invention relates to a sliding and pivoting wristlet watch, these movements making it possible to wear same either with the dial exposed or entirely protected.

The object of the invention is to provide an extremely simple construction of this kind of watch, particularly suitable for people practising sports or doing manual work.

The invention consists in placing the case of the watch in a support furnished with guides along which the case can slide, this case being further and, in certain conditions, capable of turning on pivots housed in these guides, in such a way as to be able to be completely turned over. By this turning over, it is possible to place the watch in its support, dial uppermost, as in ordinary watches, or to place it face downwards in such a way that it becomes as a metal case entirely closed and in the inside of which all the delicate parts of the watch are perfectly protected.

The invention further consists in various constructive particularities intended to guide the watch, to assure that it remains stationary in one or other of the two positions in which it is used, also to assure the immobility of the pivots during the turning over movement.

In the drawings:

Fig. 1 is a lateral view of the watch;

Fig. 2 is a corresponding view taken from above the watch;

Fig. 3 is a transverse section of the watch of Figs. 1 and 2, in the position where the dial is protected;

Fig. 4 is a section similar to that of Fig. 3, the watch having been turned over;

Fig. 5 is a section similar to that of Fig. 3, the watch being in the position where the dial is exposed;

Fig. 6 is a plan view corresponding to Fig. 4;

Fig. 7 is a transverse section similar to the section of Fig. 3, but of a watch in which the guides and the pivots are different from those of the preceding example;

Fig. 8 is also a transverse section of the watch as shown in Fig. 7, but in another position;

Figs. 9 to 15 are perspective views explaining the sliding and pivoting movement of a watch slightly different from the two preceding ones and, Figs. 15a, 15b, 15c are details of this latter example.

The watch according to Figs. 1 to 6 and 6a to 6c consists of the case 1 containing the movement and a support 2 whose general form is that of an U very much flattened out. To this support is fixed the strap 3 intended to maintain the watch on the wrist.

Figure 6A:
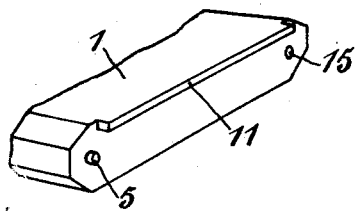
Figs. 6a, 6b, 6c show details of the construction of the watch of Figs. 1 to 6.
Figure 6B:
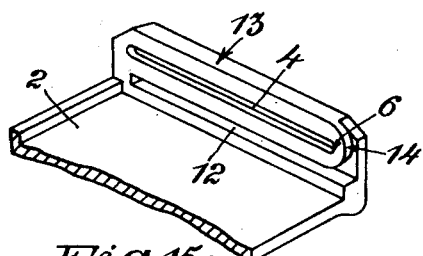

As is shown more particularly in Fig. 4 and in the perspective view of a part of the support in Fig. 6b, this support comprises two lateral guides 4 in the form of grooves, these grooves being intended to guide the pivots 5 forming part of the case of the watch and one of which is particularly visible in the perspective view of a part of the case as shown in Fig. 6a.

By fitting together the two parts represented in perspective in Figs. 6a and 6b, it is seen that the watch case 1 would be brought into the support 2 and that the pivot 5 would penetrate, in 6, into the groove 4.

The watch case thus possesses two pivots penetrating into the two grooves of the two sides of the U-shaped support, thus allowing the case 1 to slide in the inside of this support, the pivots 5 sliding for this purpose along the corresponding grooves or guides 4. By this sliding movement, it is possible, for example, to move the watch case from the position represented in Fig. 5 into that of Fig. 4, by pushing it in the direction of the arrow 7. Inversely, by pushing it in the direction of the arrow 8, it can be moved from the position of the Fig. 4 to the position in Fig. 5. In the position as shown in Fig. 5, the watch case is situated inside the support, whilst in the position of Fig. 4, it hangs almost entirely outside this support.

Besides this movement, which is the sliding movement, the watch case can turn on the pivots 5 when these latter are in the position of Fig. 4, that is to say, towards the extremity 6 of Fig. 6 of the grooves 4. This pivoting movement, which is effected in the direction of the arrow 9 on Fig. 4, allows the case to be turned from the position designated by a plain line through the position indicated by a dot and dash line, to the final position of Fig. 3. Inversely, the case may be moved from the position in Fig. 3 to the position in Fig. 4.

The complete sliding and pivoting movement is therefore effected in the following manner:

The watch case being on its support in the position of Fig. 3 which also corresponds to the position of Figs. 1 and 2, may be raised, turned on its pivots 5 until it reaches the position of Fig. 4 which is also the position of Fig. 6 to be then pushed in its support in the direction of the arrow 8, in such a way as to occupy the final position as shown in Fig. 5.

It is seen that in the position of Figs. 1, 2 and 3, the bottom of the watch case is on top, the glass and the dial 10 being inside of the support and well protected. On the contrary, in the position of Fig. 5, the glass and the dial 10 are exposed as in any ordinary watch. The passage from the first of these two positions to the second necessitated firstly a pivoting movement (Figs. 3, 4) and secondly a sliding movement (Figs. 4, 5).

If, on the contrary, the case being in the position of Fig. 5, it is desired to protect the glass and the dial, the above mentioned movements are inversely effected, that is to say, firstly a sliding movement in the direction of the arrow 7 (Figs. 5, 4) and secondly a pivoting movement in the direction of the arrow 9 (Figs. 4, 3).

The invention further provides means for preventing the pivoting movement when the pivots are in a position other than of Figs. 3 and 4. These means consist in the bottom of the watch case being provided with a narrow rim on each of the sides coming into contact with the guides and a supplementary guide 12 parallel to each of the guides 4 of the support 2. The width between the guide 4 and the guide 12 is the same as the width between the guide 4 and the upper part 13 (Fig. 6b) of the support 2 and the guide 12 and this part 13 are joined together by a semi-circular part 14 having as centre the corresponding extremity of the guide or groove 4.

In fitting together the two parts of the watch as represented in Figs. 6a, 6b, it is seen that the rim 11 of the case 1 will come to bear on the upper part 13 of the support 2. On the contrary, Figs. 3 and 4 show clearly how this rim 11 can slide tangentially on the semi-circular surface 14 when the case pivots. Fig. 5 further shows clearly how the rim 11 penetrates into the supplementary guide or groove 14 when the case slides from the position of the Fig. 4 into the position of the Fig. 5. It is also clearly seen that this arrangement prevents the watch from pivoting when the pivot 5 is not in the centre of the semicircle formed by the surface of part 14.

Figure 6C:
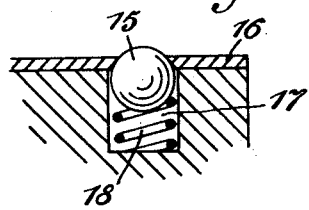
Figure 15C:
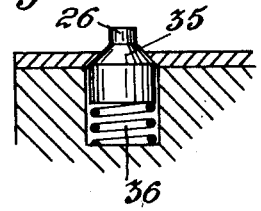

The invention also provides a device intended to maintain the watch case in each of its two final positions. This device consists in two small balls 15 situated in the watch case 1, from which they emerge slightly due to the action of a spring, as shown in Figs. 6 and 6c. The Fig. 6c shows in detail how these small balls 15 are retained by a face such as 16 of the watch case in a lodgment 17 of this case and how the spring 18 tends to push them towards the outside.

When the watch case is in one of the final positions as shown in Fig. 3 or Fig. 5, the balls 15 lightly penetrate into the guides or grooves 4 thus preventing the case from sliding or pivoting without being touched. The balls hold it in place in the manner of a press-stud.

Given the slight resistance offered by this fixation to the pivoting of the watch case from the position of Fig. 3 to that of Fig. 4 and in order to facilitate the necessary raising of this case in the direction of the arrow 19, the case is furnished with a projection 20.

The watch represented in Figs. 7, 8, 8a and 8b of the drawings, functions in exactly the same way as the watch just described, but differs in its construction as regards the means intended to assure the immobility of the pivots at the moment of pivoting.

Figure 8A:
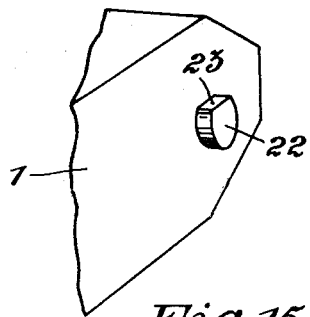
Figs. 8a and 8b are details of the watch as shown in Figs. 7 and 8.
Figure 8B:
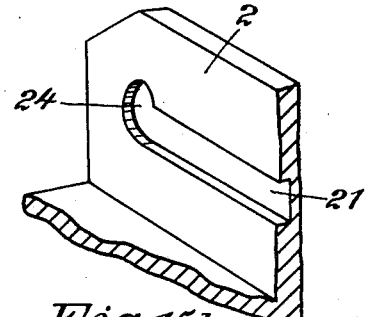

This watch, therefore, also consists of the case 1 and its support 2, a part of which has been represented in perspective on Figs. 8a and 8b. The support 2 also comprises two grooves or guides 21 different from the grooves 4 in that their width is smaller than the diameter of the corresponding pivot, this pivot 22 possesses, as seen in Fig. 8a, a flat cut part 23 so as to be able to penetrate into the groove 21, without however being able to turn therein as the width of this groove does not correspond to the diameter of the pivot 22.

At one of its extremities, the groove 21 has a larger circular part 24 corresponding to the diameter of the pivot 22 and in which this pivot can then turn.

Fig. 7 shows the watch case 1 in the position where its pivot can turn, that is to say, in the pivoting position. Fig. 8, on the contrary, represents the watch case during the sliding movement and in a position where the pivot 22 cannot turn in the guide or groove 21.

This watch is also maintained in its support by balls 15 similar to those represented in Fig. 6c.

The watch according to Figs. 9 to 15 and 15a to 15c differs from the preceding ones in that it can pivot at both ends of the guides of its support and by various other details which will appear from the following.

The watch also consists of the case 1 and a support 2, the case 1 being able to be placed in the support, either in the non-protected position of Fig. 9, or in the protected position of Fig. 13, the other figures showing intermediate positions between these two extreme or final positions. The watch strap is fixed to the small bars 25.

The case 1 of the watch also possesses pivots 26 intended to penetrate into the guides or grooves 27 of the support 2 in order to allow the sliding and pivoting movement of said watch case.

As will be seen from the drawings, the guides or grooves 27 are not rectilinear as in the preceding examples, but slightly curved. The same applies to the bottom 28 of the support and the faces 29 and 30 (Fig. 14) forming the bottom and the top of the watch case 1. This curved form of these various parts results in the watch sliding, not in one plane, but in a portion of a cylindrical surface of very large radius. Thus in sliding, the watch case is raised slightly as it leaves its support, a movement which is particularly visible on Figs. 10 and 11, the first showing an intermediary position and the second the final position occupied by the case 1 when it is caused to slide in the direction of the arrow 31 on Fig. 9.

The turning over of the case from the position of Fig. 9 into the position of Fig. 13 is therefore effected by pushing the case in the direction of the arrow 21 through the intermediary position of Fig. 10 in the extreme sliding position of Fig. 11. From this position and in the direction of the arrow 32, through the intermediary position of Fig. 12, the watch is pivoted until it reaches the position as represented in Fig. 13. This latter movement is effected on the pivots 26 situated at this moment at the left extremity of the guides or grooves 27 as shown in the drawings.

Inversely, in order to bring the case back into its original position, it is pushed in the direction of the arrow 33 on Fig. 13 so that it slides into the position on Fig. 14 and is then pivoted through the intermediary position on Fig. 15 into the final position of Fig. 9. In effecting this latter movement, the case turns on the pivots now being situated in the guides or grooves 27, on the right as shown in the drawings.

In order to assure the position of the pivots 26 during the pivoting movement which can now be effected at both extremities of the guides 27, these guides posses a conical cut out part 34 in which penetrates a corresponding conical part of the pivots which are furnished with springs.

Figure 15A:
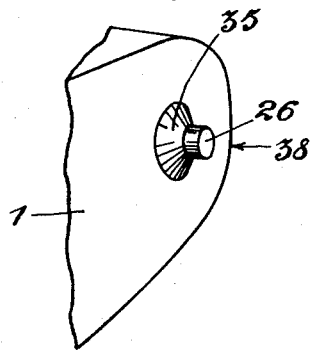
Figure 15B:
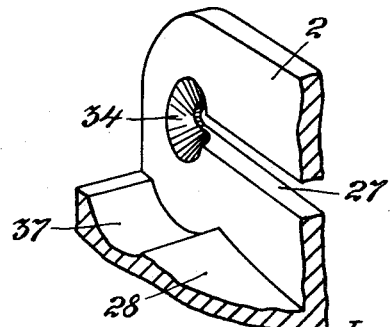

The Figs. 15a and 15b show the details of this construction, the pivot 26 having a conical part 35 able to penetrate into the corresponding conical cut out part 34 of the guide 27. For this purpose, the pivot 26 is mounted in a similar manner to the ball 15 represented in Fig. 6c, as may be seen from Fig. 15c, where the pivot 26 with its conical part 35 is subjected to the action of a spring 36. The watch represented, moreover, also possesses balls 15 functioning in exactly the same way as in the preceding cases, with this difference that each ball enters into the final positions in the corresponding conical cut out parts 34 of the grooves 27.

In order to avoid the watch case pivoting in another position than that where the pivot is housed in the corresponding conical cut out parts 34 of the guides 27, the support 2 of the case 1 possesses two cylindrical grooves 37 having as their geometrical axis, the pivoting axis of the case in each of its two extreme sliding positions. The corresponding front side 38 of the watch case 1, is also in the form of a portion of a cylinder whose axis would be the pivoting axis of the case, this front side being intended to penetrate into the corresponding cylindrical groove 37 during the pivoting movement. This groove being deeper, that is to say, its bottom being further away from the guide 27 than the curved bottom 28 of the support 2, the pivoting of the case can only take place when its front side 38 is above one of the grooves 37 and the pivots 26 in the corresponding conical cut out parts 34.

The fact that during the sliding movement the watch case is slightly raised in relation to its support, is very important in that it facilitates the pivoting. It is easier to pass with the finger under the case in order to turn it, if this case is raised instead remaining pressed against the arm.

It will be understood that certain changes and modifications of the invention can be made without departing from the scope or spirit thereof as defined in the claims.

What I claim as new and desire to secure by Letters Patent is:—

1. A wrist watch comprising a support, a case containing the watch movement, pivots on a selected one of said support and said case, guides on the other one of said support and said case, the said pivots being received in and slidable along said guides, a selected one of said support and said case being slidable in said guides and turnable on said pivots, whereby the watch case may be completely turned over to protect the face, and the case received entirely within the confines of the support.

2. A wrist watch comprising a support, a case containing the watch movement, pivots on a selected one of said support and said case, guides on the other one of said support and said case, the said pivots being received in and slidable along said guides, a selected one of said support and said case being slidable in said guides and turnable on said pivots, whereby the watch case may be completely turned over to protect the face, and the case received entirely within the confines of the support, and spring biased balls disposed on that one of said support and said case which carries the pivots, and adaptable for reception in the said guides, when the case is in one of its extreme positions for rendering the said support and said case stationary relative to each other.

3. A wrist watch comprising a support, a case containing the watch movement, pivots on a selected one of said support and said case, guides on the other one of said support and said case, the said pivots being received in and slidable along said guides, a selected one of said support and said case being slidable in said guides and turnable on said pivots, whereby the watch case may be completely turned over to protect the face and the case received entirely within the confines of the support, and locking means provided on that one of said support and said case which carries the pivots, for securing said support and said case, when the case is in either of its extreme positions, substantially stationary to each other.

4. A wrist watch comprising a substantially U-shaped support, a case containing the watch movement, guides provided on and forming the walls of said U-shaped support, pivots on said case and received in said guides, whereby the case may be slidable in the guides, the case being turnable on the pivots and thus be completely turned over, a rim extending along the longitudinal sides of said case adjacent the bottom thereof and serving, in conjunction with said guides, as a guide for the case, and preventing it from pivoting during sliding movement, the said support having semicircular parts about which said rim slides tangentially when the case is in one of its extreme positions, and means on said support forming grooves which, together with said guides, cooperate with said rims to guide the case.

5. A wrist watch comprising a support, a case containing the watch movement, pivots on a selected one of said support and said case, guides on the other one of said support and said case, the said pivots being received in and slidable along said guides, a selected one of said support and said case being slidable in said guides and turnable on said pivots, whereby the watch case may be completely turned over to protect the face, and the case received entirely within the confines of the support, and a projection on a selected one of said support and said case, whereby that member bearing the said projection may be held when it is desired to effect the pivoting movement.

6. A wrist watch comprising a substantially U-shaped support, a case containing the watch movement, guides provided on and forming the walls of said U-shaped support, pivots mounted on said case and extending into said guides, and slidable therealong, the case being turnable on said pivots, whereby the watch case may be completely turned over, the said pivots having a cylindrical form with a flattened portion, the corresponding guides comprising grooves the width of which corresponds to the smallest thickness of the pivots, whereby the pivots are slidable laterally in said grooves without turning about their axis, the guides having a circular opening adjacent at least one end of the grooves, in which the pivots are completely rotatable and in which the pivoting is effected.

7. A wrist watch comprising a support, a cast containing the watch movement, guides in the said support, conical, cut out portions at each end of the said guides, pivots disposed on the said case and extending into said guides, and slidable therein, the said case being turnable on said pivots so that the watch case can be completely turned over, and springs tending to urge said pivots outwardly from said case into said guides, each pivot having a conical part adapted for cooperation with said corresponding cut out portion of the guides, whereby the pivots are restrained from sliding during the rotation of the watch case.

8. A wrist watch comprising a support, a case containing the watch movement, guides on the said support, the said guides and the bottom of the said support being curved, and pivots on said case, extending into said guides, whereby the case is slidable in said guides and turnable about said pivots, the two large faces of the case having a curve complemental to that of the guides and support, whereby the case is slightly raised during its sliding movement.

9. A wrist watch comprising a substantially U-shaped support, a case containing the watch movement, guides on and forming the walls of said U-shaped support, pivots on said case, and extending into said guides, the case thus being slidable in said guides and turnable about the pivots, so that the watch can be completely turned over, the bottom of the support having two cylindrical grooves substantially parallel to, and adjacent the pivoting axis of the case when it is in the corresponding extremity of the guides, one of the transverse edges of the case also being substantially cylindrical, whereby it fits into said grooves during the turning of the case.

10. A wrist watch comprising a support, a case containing the watch movement, guides in the said support, pivots on said case, and extending into said guides, the case thus being slidable in said guides and turnable about the pivots, so that the watch can be completely turned over, the bottom of the support having two cylindrical grooves substantially parallel to, and adjacent the pivoting axis of the case when it is in the corresponding extremity of the guides, one of the transverse edges of the case also being substantially cylindrical, whereby it fits into said grooves during the turning of the case, an edge or higher bottom being provided on the support between the said two grooves, which edge prevents the rotation of the said cylindrical edge of the case when attempts are made to rotate the case in any position other than its extreme positions, and preventing turning in other than the said extreme position.

RENÉ ALFRED CHAUVOT.